(12) United States Patent
Mann et al.

(10) Patent No.: US 8,694,133 B2
(45) Date of Patent: Apr. 8, 2014

(54) CONTROL SYSTEMS AND METHODS FOR MACHINING OPERATIONS

(75) Inventors: James B. Mann, West Lafayette, IN (US); Christopher J. Saldana, West Lafayette, IN (US); Wilfredo Moscoso, West Lafayette, IN (US)

(73) Assignee: M4 Sciences, LLC, West Lafayette, IN (US)

( * ) Notice: Subject to any disclaimer, the term of this patent is extended or adjusted under 35 U.S.C. 154(b) by 430 days.

(21) Appl. No.: 12/876,126

(22) Filed: Sep. 4, 2010

(65) Prior Publication Data

US 2011/0066277 A1    Mar. 17, 2011

Related U.S. Application Data

(60) Provisional application No. 61/240,201, filed on Sep. 5, 2009.

(51) Int. Cl.
*G06F 19/00* (2011.01)

(52) U.S. Cl.
USPC .............. 700/56; 700/160; 700/170; 700/174

(58) Field of Classification Search
USPC ................................... 700/56, 160, 170, 174
See application file for complete search history.

(56) References Cited

U.S. PATENT DOCUMENTS

| | | |
|---|---|---|
| 655,868 A | 8/1900 | Holtgen |
| 2,452,211 A | 10/1948 | Rosenthal |
| 2,453,136 A | 11/1948 | Karweit |
| 2,515,539 A | 4/1950 | Wichman |
| 2,514,759 A | 7/1950 | Hallden |
| 2,521,900 A | 9/1950 | Clark |
| 3,003,372 A | 10/1961 | Findley |

(Continued)

FOREIGN PATENT DOCUMENTS

| | | |
|---|---|---|
| DE | 2436340 | 3/1975 |
| DE | 9212079 | 12/1992 |

(Continued)

OTHER PUBLICATIONS

Rahman, Modeling and Measurement of Multi-Axis Machine Tools to Improve Positioning Accuracy in a Software Way, Dec. 2004,[retrieved on Nov. 9, 2010 909.11.2010)]. http://herkules.oulu.fi/sbrr951427332X/isbn951427332X.pdf.

(Continued)

*Primary Examiner* — Michael D Masinick
(74) *Attorney, Agent, or Firm* — E. Victor Indiano; Indiano Law Group, LLC

(57) ABSTRACT

A method is provided for controlling a machining operation wherein a tool performs a machining operation on a workpiece. The method includes providing a tool holder for holding a tool, a workpiece holder for holding a work piece, and a linear slide for linearly moving a linearly moving part that is either the tool or the workpiece. The step of selecting appropriate machining parameters includes the step of selecting an appropriate feed rate for the linear slide move the linear moving part and appropriate rotational speed is selected for the rotator to rotate the rotating part. The set of appropriate machining parameters are incorporated into the digital controller. The digital controller is then used to control the operation of a linear slide, rotator and modulator to execute the machining of the workpiece by the tool in accordance with a selected appropriate set of parameters.

21 Claims, 7 Drawing Sheets

(56) References Cited

U.S. PATENT DOCUMENTS

| | | | |
|---|---|---|---|
| 3,015,914 A | 1/1962 | Roney | |
| 3,028,771 A | 4/1962 | Bunnell | |
| 3,056,320 A | 10/1962 | Findley | |
| 3,105,482 A | 10/1963 | Mieville | |
| 3,174,404 A | 3/1965 | Findley | |
| 3,303,522 A | 2/1967 | Kumabe et al. | |
| 3,471,724 A | 10/1969 | Lewis | |
| 3,504,516 A | 4/1970 | Sundberg | |
| 3,513,309 A | 5/1970 | Hehemann | |
| 3,548,998 A * | 12/1970 | Heller | 198/468.9 |
| 3,559,259 A | 2/1971 | Kumabe | |
| 3,619,671 A | 11/1971 | Shoh | |
| 3,713,045 A | 1/1973 | Usuda et al. | |
| 3,754,487 A | 8/1973 | Nachigal | |
| 3,837,121 A | 9/1974 | Schirmer | |
| 4,052,132 A | 10/1977 | Oates | |
| 4,104,900 A | 8/1978 | Nels | |
| 4,261,675 A | 4/1981 | Zankl | |
| 4,559,600 A | 12/1985 | Rao | |
| 4,640,156 A | 2/1987 | Nakagawa et al. | |
| 4,646,595 A | 3/1987 | Slee | |
| 4,653,235 A | 3/1987 | Farmer | |
| 4,659,900 A * | 4/1987 | Gilli et al. | 219/121.67 |
| 4,667,546 A | 5/1987 | Dombrowski et al. | |
| 4,887,221 A * | 12/1989 | Davis et al. | 700/181 |
| 4,911,044 A | 3/1990 | Mishiro et al. | |
| 5,021,941 A | 6/1991 | Ford et al. | |
| 5,113,728 A * | 5/1992 | Medeksza | 82/1.11 |
| 5,291,812 A | 3/1994 | Yen et al. | |
| 5,331,870 A | 7/1994 | Chin-Long | |
| 5,342,152 A * | 8/1994 | Medeksza | 408/1 R |
| 5,448,146 A * | 9/1995 | Erlbacher | 318/568.17 |
| 5,558,477 A | 9/1996 | Browning et al. | |
| 5,778,745 A | 7/1998 | Furusawa et al. | |
| 5,857,814 A | 1/1999 | Jang | |
| 5,911,802 A | 6/1999 | Kimura et al. | |
| 5,939,146 A | 8/1999 | Lavernia | |
| 5,957,016 A | 9/1999 | Segalman et al. | |
| 6,084,363 A | 7/2000 | Mizumoto | |
| 6,122,999 A | 9/2000 | Durazo et al. | |
| 6,202,521 B1 | 3/2001 | Rossetti et al. | |
| 6,234,728 B1 | 5/2001 | Brun-Picard et al. | |
| 6,465,931 B2 | 10/2002 | Knowles et al. | |
| 6,470,225 B1 * | 10/2002 | Yutkowitz | 700/44 |
| 6,599,178 B1 | 7/2003 | Gluche et al. | |
| 6,706,324 B2 | 3/2004 | Chandrasekar et al. | |
| 6,718,854 B2 | 4/2004 | Bedi et al. | |
| 6,925,915 B1 | 8/2005 | Claesson et al. | |
| 7,131,797 B2 | 11/2006 | Kai et al. | |
| 7,216,571 B2 | 5/2007 | Schreiber et al. | |
| 7,628,099 B2 | 12/2009 | Mann et al. | |
| 2002/0150496 A1 | 10/2002 | Chandrasekar et al. | |
| 2005/0039513 A1 | 2/2005 | Fabris | |
| 2005/0167008 A1 | 8/2005 | Chandrasekar et al. | |
| 2006/0248980 A1 | 11/2006 | Mann et al. | |
| 2006/0251480 A1 | 11/2006 | Mann et al. | |
| 2008/0238255 A1 | 10/2008 | Lee et al. | |
| 2011/0066277 A1 * | 3/2011 | Mann et al. | 700/174 |

FOREIGN PATENT DOCUMENTS

| | | |
|---|---|---|
| DE | 10343682 | 4/2005 |
| JP | 56045336 | 4/1981 |
| JP | 7164217 | 6/1995 |
| JP | 2002126902 | 5/2002 |
| WO | WO03061886 | 7/2003 |
| WO | WO2006002675 | 1/2006 |

OTHER PUBLICATIONS

WIPO, Search report and search history from corresponding Mann et al PCT patent application No. PCT/US2010/047926 filed Sep. 4, 2010.

* cited by examiner

CONTROL SYSTEMS AND METHODS FOR MACHINING OPERATIONS

PRIORITY STATEMENT

This application claims benefit of James B. Mann et al., U.S. Provisional Patent No. 61/240,201 which was filed on 5 Sep. 2009, and which is specifically incorporated in its entirety herein by reference.

I. TECHNICAL FIELD OF THE INVENTION

The present invention relates to machining processes, and more particularly, to a process for controlling a machining process that includes a modulated engagement between a tool and a workpiece.

II. BACKGROUND OF THE INVENTION

Machining processes have existed for many years. Recently, the Applicants (and the Assignee of the instant invention) have discovered a significantly improved machining process that involves the use of modulated movements of a tool and workpiece relative to each other. This general process tool holder assembly and machining method are described in prior applications filed by one or more of the Applicants of the instant invention, and that are licensed to the Assignee of the present invention including U.S. Pat. Nos. 7,587,965 and 7,628,099.

U.S. Pat. No. 7,587,965 (US20060251480) and U.S. Pat. No. 7,628,099 (US20060243107) are wholly incorporated herein by reference, along with U.S. Provisional application No. 61/240,201 from which this application claims benefit. The symbolic notations used in this application are consistent with these previously issued patents.

U.S. Pat. Nos. 7,587,965 and 7,628,099 disclose that modulation tool holder assemblies and methods of modulation can improve machining performance (U.S. Pat. No. 7,587,965) or can create machined chips with controlled size and shape (U.S. Pat. No. 7,628,099). This modulation can be applied in different configurations. If modulation is applied in the direction of the undeformed chip thickness, then the undeformed chip thickness, h(t), periodically becomes zero or negative under the appropriate modulation conditions (mathematically $h(t) \leq 0$, but the undeformed chip thickness physically becomes zero when $h(t) = \leq 0$)

Alternatively, if modulation is applied in the direction of cutting velocity, then the instantaneous velocity between the tool and workpiece, $v_{cm}$, periodically becomes zero or negative under the appropriate modulation conditions. These conditions wherein $h(t)$ or $v_{cm}$ become zero or negative can yield improvements in machining performance, as described in the '965 patent.

The present invention relates to methods and devices that seek to improve upon the processes and devices disclosed in the '965 and '099 patents by providing various control systems and mathematical algorithms for modulation-assisted tool assemblies and processes that hopefully improve the process and the products made from the process. According to a preferred aspect of the invention, the control systems and algorithms described are particularly well suited for use by a modulation tool holder assembly that is useful in drilling processes. Also, control systems and algorithms are disclosed in connection with the present invention that are intended for other machining processes and/or for the production of metal particles of controlled size and shape. Adjustments can be made to the modulation conditions to suit the specific type of machining process.

III. BRIEF SUMMARY OF THE INVENTION

In accordance with the present invention, a method is provided for controlling a machining operation wherein a tool performs a machining operation on a workpiece. The method includes providing a tool holder for holding a tool, a workpiece holder for holding a work piece, and a linear slide for linearly moving a linearly moving part that comprises at least one of the tool and workpiece. A rotator is provided for rotating a rotating part comprising at least one of the tool and work piece. A linear actuator modulator is provided for modulating the movement of a modulated part comprising at least one of the tool and workpiece, and a digital controller is provided for controlling the machining of the workpiece by the tool. Appropriate machining parameters are selected for enabling the tool to perform a desired machining operation on the workpiece. The step of selecting appropriate machining parameters includes several steps. One step is selecting an appropriate feed rate for the linear actuator to move the linear moving part.

Also, an appropriate rotational speed is selected for the rotator to rotate the rotating part. An appropriate modulation amplitude is selected for the linear actuator of the modulator to employ to move the modulated part an appropriate distance in each cycle of modulation. An appropriate modulation frequency is selected for the modulator to employ to move the modulated part an appropriate number of modulation cycles in a given time interval.

The set of appropriate machining parameters are incorporated into the digital controller. The digital controller is then used to control the operation of a linear slide, rotator and modulator to execute the machining of the workpiece by the tool in accordance with a selected appropriate set of parameters.

Preferably, the linear actuator in a modulation device is controlled by a signal (e.g., voltage or current) that commands the actuator to move the tool holder (and hence the machining tool) with a prescribed oscillation motion. The frequency and amplitude of the signal controlling the linear actuator cause a superimposed motion of the tool cutting edge during modulation-assisted machining. With the appropriate modulation and machining conditions, an intermittent separation can occur between the cutting tool and the workpiece.

In a preferred embodiment, the step of selecting an appropriate modulation frequency and modulation amplitude comprises the step of selecting an input wave form having the desired modulation amplitude and modulation frequency characteristics. Such wave forms include things such as generally sinusoidal wave forms, generally triangular wave forms and generally square wave forms.

Preferably, machine parameters are input into an algorithm for adjusting the control signal sent by the digital controller to at least one of the linear slide, rotator and modulator, for controlling the operation of the at least one of a linear slide, rotator and modulator. A sensor can be provided for determining an output parameter of at least one of the tool, workpiece and chips during a machining operation. In a closed-loop system, this determined output parameter can be used to adjust the operation of at least one of the linear slide, rotator and modulator, to improve the output of the machining operation.

One feature of the present invention is that the present invention provides a method for controlling the operation of a machine that incorporates modulation, in a manner that controls the operational characteristics of the various components of the machine. This feature has the advantage of enabling a user to adjust the parameters of the machine, and control the operating parameters of the machine in a manner that helps to optimize attributes of the machining process such as chip size and shape, machining speed, machining feedrate, tool wear, temperature, force, product production rates, product consistency, and product quality.

These and other features of the present invention will become apparent to those skilled in the art upon a review of the detailed description and drawings discussed below that set forth the best mode of practicing the invention perceived presently by the Applicants.

IV. BRIEF DESCRIPTION OF THE DRAWINGS

FIGS. 1A, 1B and 1C comprise images of machining chips formed by a drilling process wherein FIG. 1A shows a chip formed by conventional drilling without modulation;

Figure 3A:
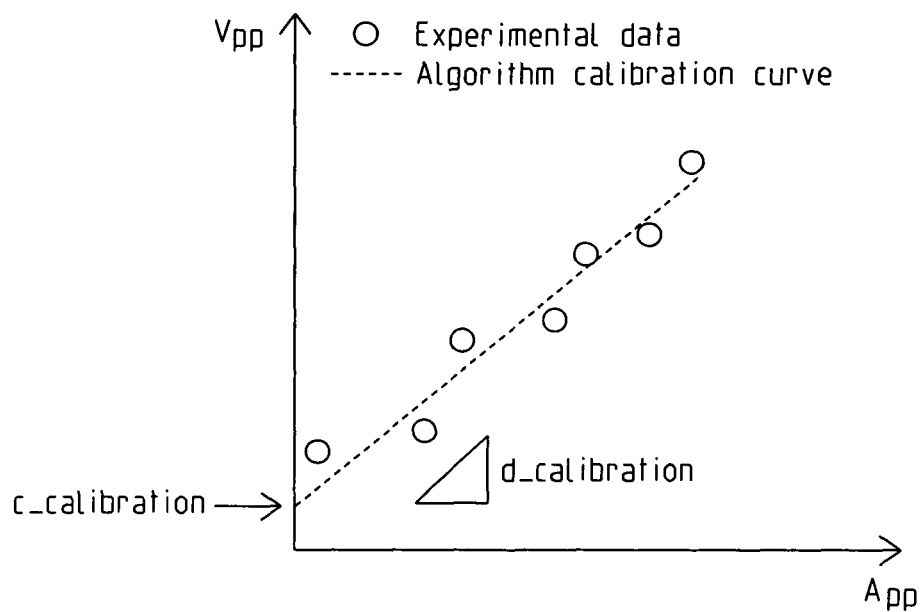
Figure 3B:
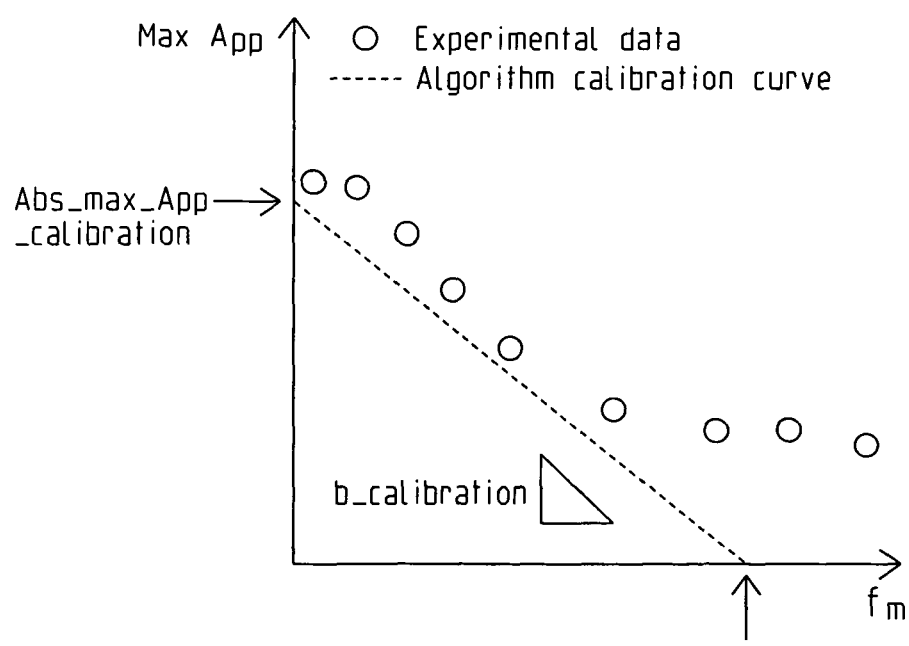
Figure 4:
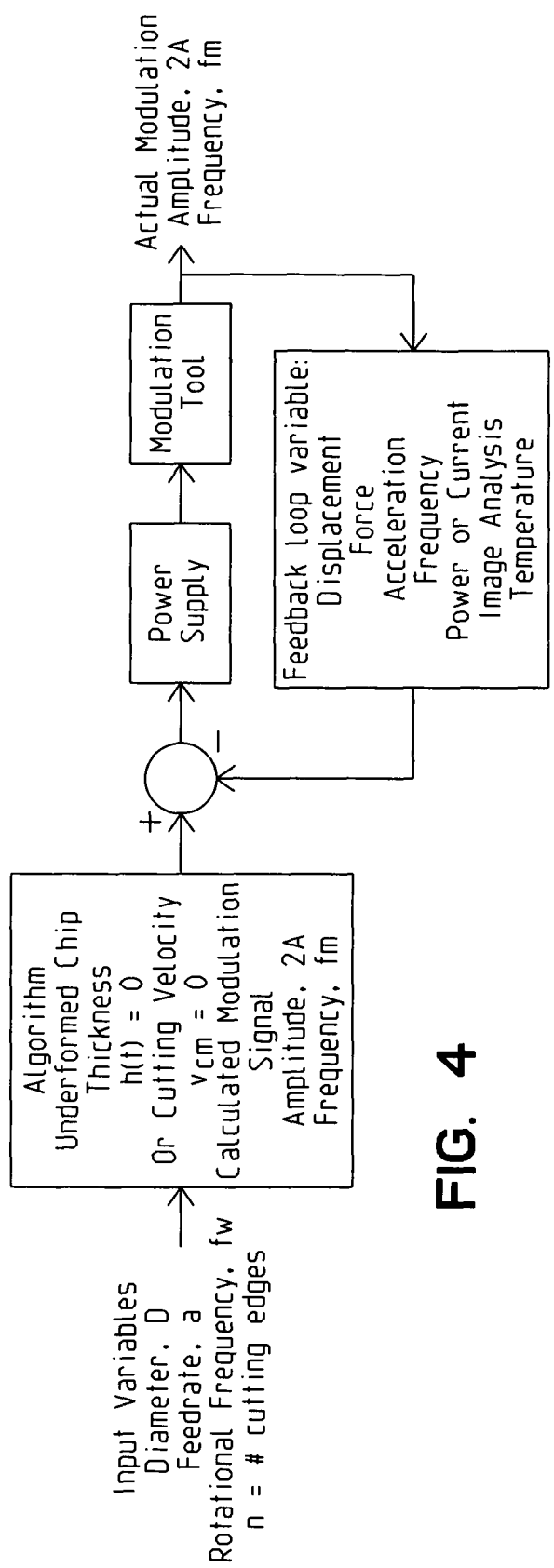
Figure 5:
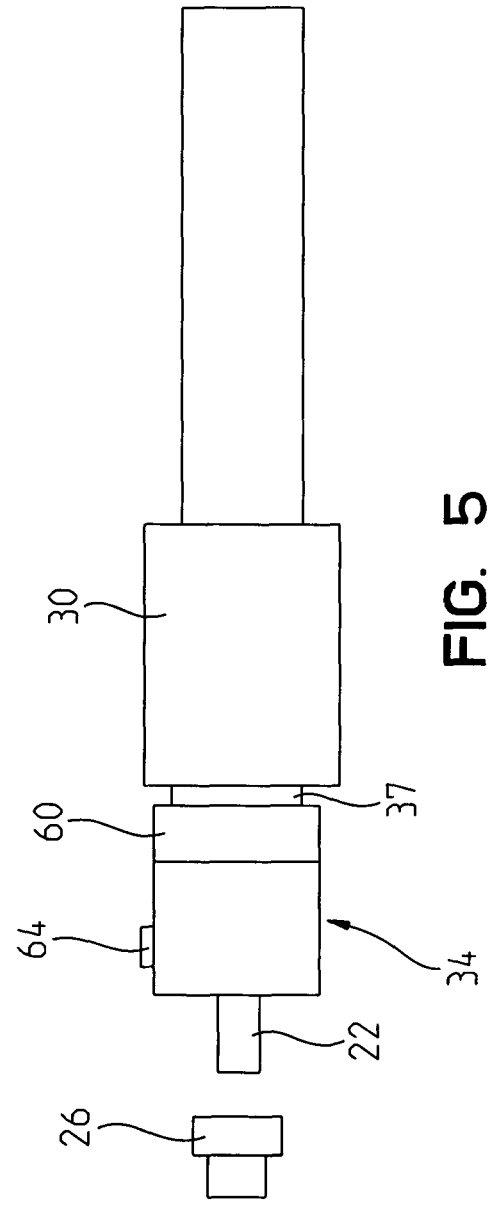
Figure 6:
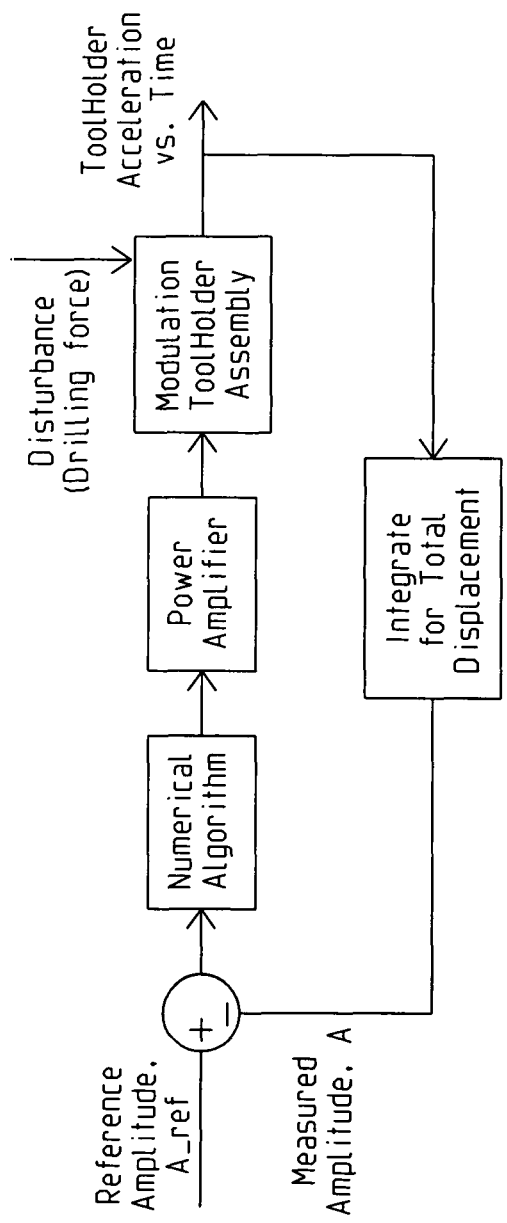
Figure 7:
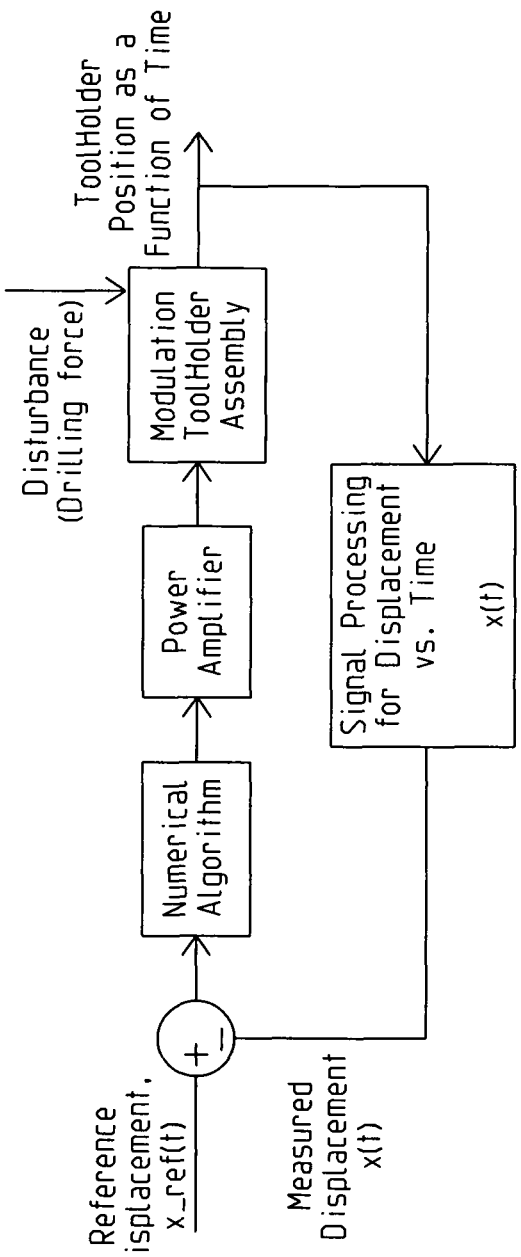
Figure 8:
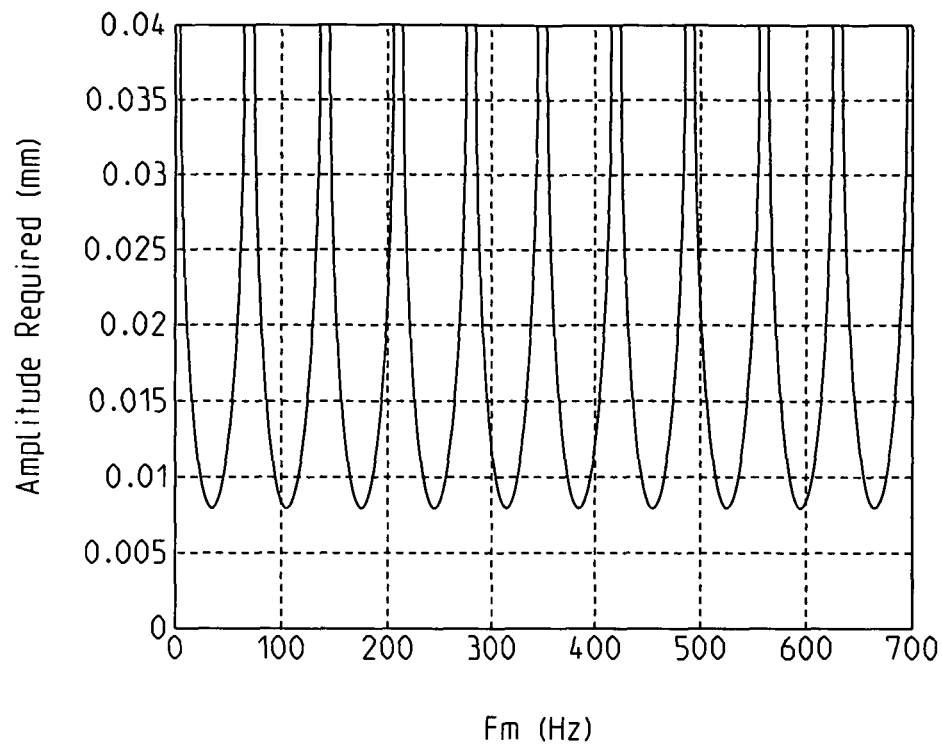
Figure 9:
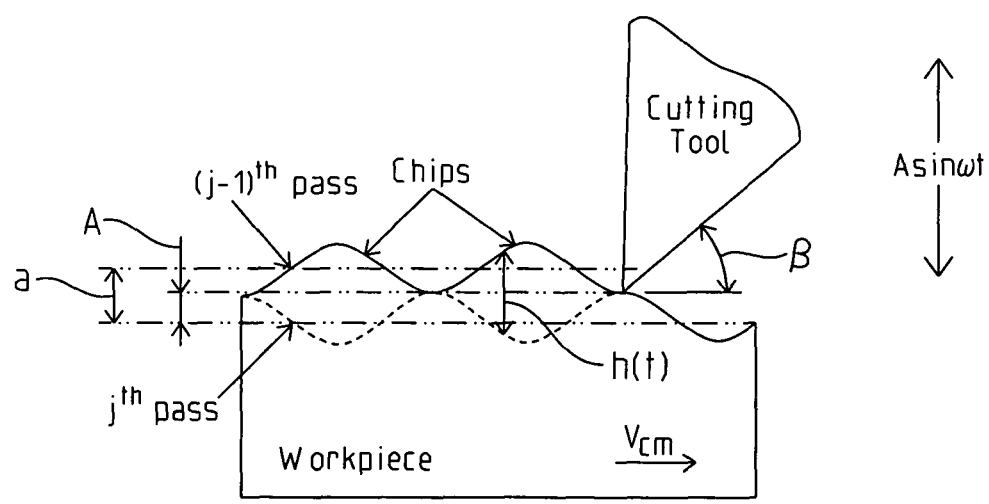
Figure 10:
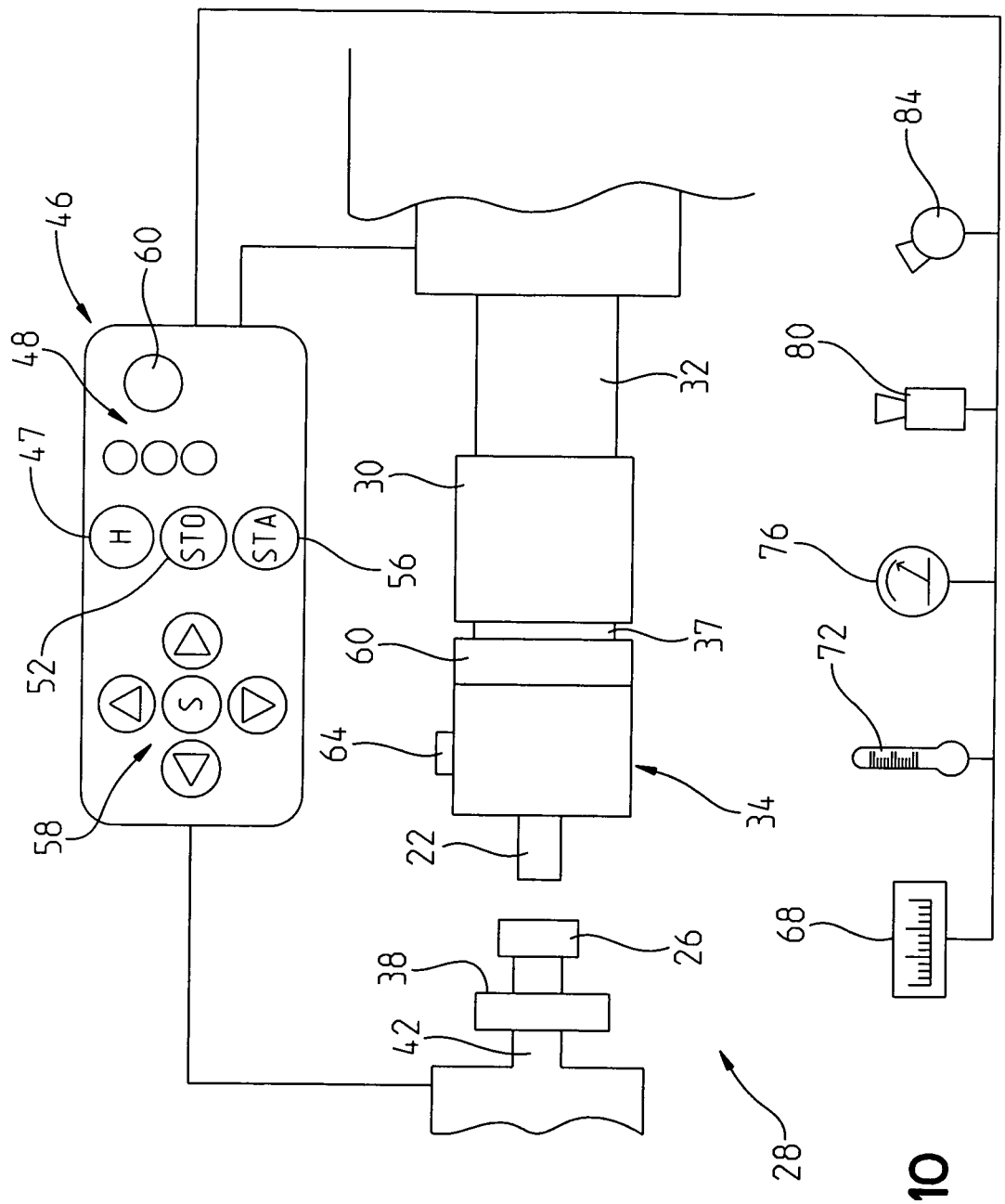

FIGS. 3A and 3B shows a conceptual calibration of a modulation assisted tool holder assembly piezo-electric based linear actuator under a static loading condition (load, torque); wherein FIG. 3A is a graph of the peak-to-peak amplifier voltage Vpp required to achieve a peak amplitude App at a particular modulation frequency; and FIG. 3B is a graph of the maximum amplitude of modulation App as a function of modulation frequency wherein the graph of FIG. 3A is constructed taking the maximum amplitude of modulation App that can be applied for each modulation frequency tested;

FIG. 4 is a schematic flow chart representation of a closed-loop control of the modulation-assisted machining process showing examples of possible feedback control variables;

FIG. 5 is a schematic representation of exemplary force dynamometer and accelerometer measurement systems installed in a tool holder assembly for modulation-assisted machining using closed-loop feedback control;

FIG. 6 is a schematic flow chart representation of a closed-loop control of the modulation-assisted machining process where the actual amplitude of modulation is controlled by measuring the total amplitude of the modulation tool holder; and the magnitude of the tool holder displacement is determined by integration of accelerometer measurements;

FIG. 7 is a schematic flow chart representation of a closed-loop control of the modulation-assisted machining process where the position of the modulation tool holder is measured as a function of time and compared to a reference displacement, also verifying the presence of a sinusoidal displacement, and wherein the instantaneous tool holder displacement at any time interval is measured by a motion sensor (e.g., accelerometer, displacement probes, or digital encoder);

FIG. 8 is a graphic flow chart representation of a possible numerical solutions for required modulation amplitude as a function of modulation frequency for undeformed chip thickness h(t)≤0. The graph corresponds to the machining conditions in FIG. 1 for drilling with a single flute drill and machining conditions of feedrate a=0.016 mm/rev and rotational frequency of fw=70 Hz;

FIG. 9 is a schematic representation of process variables and geometric constraints for modulation-assisted machining; and FIG. 10 is a schematic representation of the various components used in connection with the present invention.

V. DETAILED DESCRIPTION OF THE INVENTION

A. Overview of Machining Using Modulation and the Products Produced Thereby

The present invention includes control systems and algorithms that can be used to establish effective modulation conditions by determining the input signal to the linear actuator of the modulator and, hence, controlling the motion of the tool cutting edge. In one embodiment, this motion has a periodic sine-wave form. However, other embodiments exist that employ other types of periodic waveforms. The reader's attention is first directed to FIG. 1, comprising FIGS. 1A, 1B and 1C that illustrate the end product chips produced by the prior art (FIG. 1A) and the present invention (FIG. 1C). The chips shown FIG. 1 were created using a periodic sine-wave form of modulation motion; however, other types of periodic waveforms may be considered.

The images in FIG. 1 show chips formed by a drilling process wherein, for these particular conditions, effective modulation entails periodic disruption of the contact between the cutting tool and workpiece. The chips are produced using similar machining conditions with a single edge drilling tool, but with varying modulation-assisted machining parameters. These images illustrate the importance of control of modulation conditions in modulation-assisted machining.

Figure 1A:
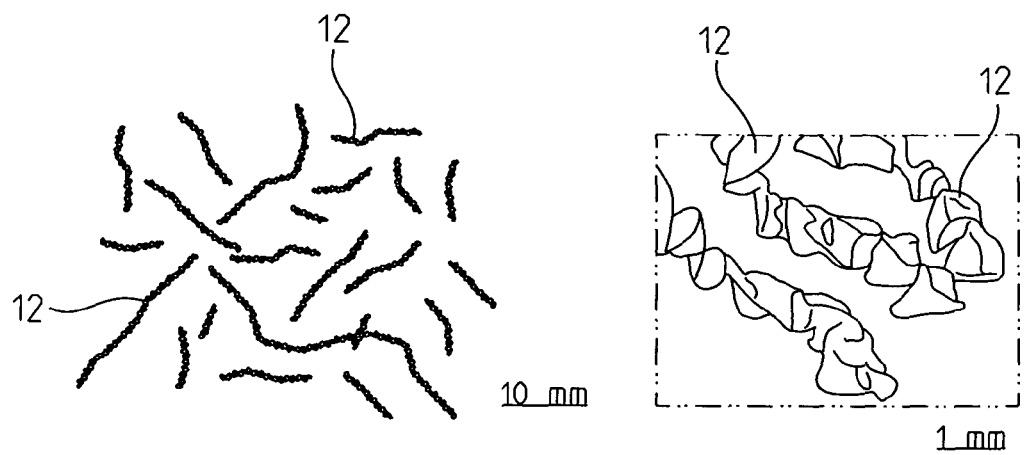
FIG. 1B shows a chip formed by modulation-assisted drilling where h(t)=constant.
FIG. 1C shows a chip formed by modulation-assisted drilling of the present invention where h(t)<0 during each modulation cycle.
Figure 1B:
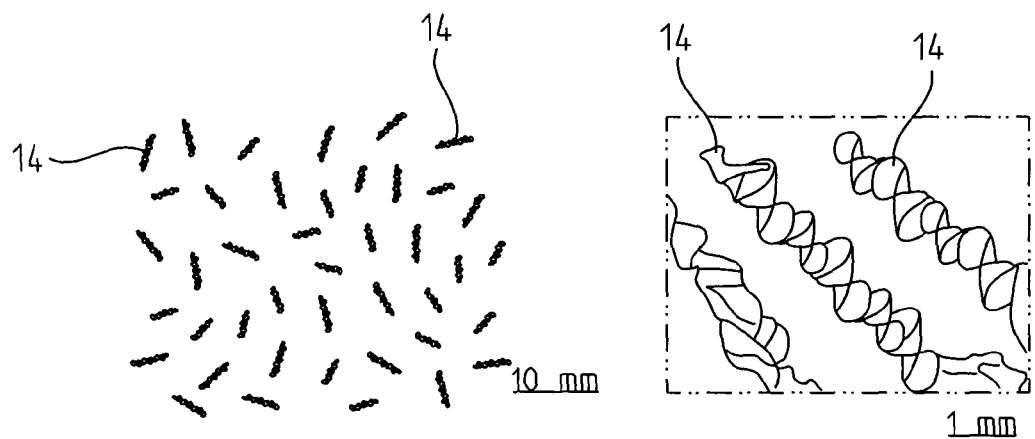
Figure 1C:
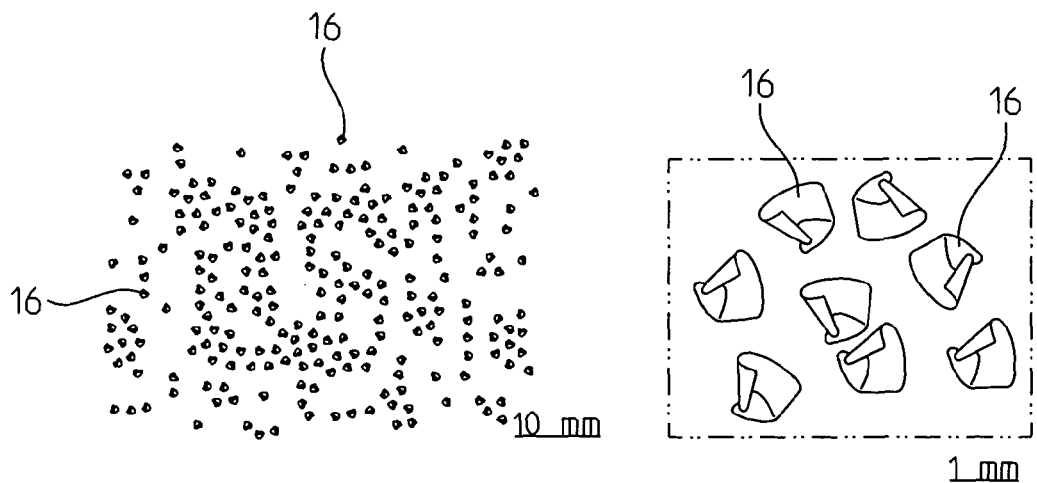

FIG. 1A shows the formation of continuous ribbon-like machining chips 12 that occur in conventional machining without modulation (a=0.016 mm/rev, fw=4200 RPM). FIG. 1B shows chips 14 formed by modulation with constant undeformed chip thickness (a=0.016 mm/rev, fw=4200 RPM, fm=70 Hz, 2A≈0.020 mm), rather similar to those of FIG. 1A. The image in FIG. 1C shows chips 16 that form with modulation conditions where undeformed chip thickness becomes zero or negative at a point during each cycle of modulation and the tool is intermittently separated from the workpiece (a=0.016 mm/rev, fw=4200 RPM, fm=105 Hz, 2A≈0.020 mm). For this particular case, the modalities of ineffective and effective modulation-assisted machining are clear. As shown in FIGS. 1B and 1C, the presence of modulation alone is not usually sufficient to ensure an effective modulation condition as a chip formed with modulation can be continuous (h(t)>0) and no intermittent separation occurs between the tool and the workpiece.

Importantly, an effective modulation condition for the above situation is described as intermittent separation of the contact between the tool 22 (FIGS. 5 and 10) and the workpiece 26, the definition of effective modulation may vary depending on the specific purpose of the application of modulation. For example, modulation may also be applied by a modulator such as modulation tool holder assembly 30 in a machining process to create machining chips (e.g. 16) of a specific size and shape. In such configurations, effective modulation would require that the modulation motion be sufficiently accurate to create a specific geometry for the machining chips. In this regard, the actual motion of the tool 22 during modulation-assisted machining is important, as the ability to separate the contact between the tool 22 and workpiece 26 is not a sufficient condition alone to guarantee effectiveness. While other embodiments follow the development of similar other criteria for effectiveness, these are all related by the actual contact conditions between the tool 22 and workpiece 26.

For modulation-assisted machining processes, the actual relative motion between the tool 22 and the workpiece 26 can depend on many factors, including, but not limited to, the dynamic response of the actuator mechanism 32, friction, cutting forces, compliance of the various physical elements of the tool holder assembly 30, and/or compliance of the machine tool 22 itself. These factors may negatively affect the ability of the tool holder assembly (FIG. 10) to achieve the prescribed modulation motion, possibly rendering the modulation ineffective, even in situations where the proper parameters have been selected. Thus, the effect of these parameters must be considered in the determination of appropriate modulation conditions.

Further, in some situations it may be necessary to monitor the contact between the cutting tool 22 and the workpiece 26 in situ in order to ensure effective modulation conditions. The contact conditions between the tool and the workpiece and the presence of an intermittent gap between the cutting tool 22 and the workpiece 26, can be confirmed using a variety of measurement systems.

By engineering and implementing appropriate control systems and control algorithms, modulation conditions can be prescribed for the improvement of machining processes, as described in U.S. Pat. No. 7,587,965. Moreover, such control systems and algorithms for modulation-assisted machining would also provide a means to precisely control the size and shape of the machining chip 16 when modulation is used as a materials processing method, as described in U.S. Pat. No. 7,628,099.

B. Overview of the Invention

Systems and methods are provided for controlling tool holder assemblies and machining configurations that involve modulated motion of the cutting tool 22 or workpiece 26 during machining. In modulation-assisted machining, the application of a controlled, low-frequency sinusoidal modulation (typically <1000 cycles per second) divides the otherwise continuous cutting process into a series of discrete cutting events equal to the modulation frequency This modulation is facilitated by a tool holder linear actuator (a combination of 30, 32, 34) that is controlled by a sinusoidal electrical signal prescribed by a mathematical algorithm.

Modulation applied in the direction of cutting velocity can cause the instantaneous cutting velocity to become zero or negative. This causes the instantaneous cutting velocity to alternate between positive and negative values, and creates an intermittent gap between the cutting edge of the tool 22 and the workpiece 26. Modulation applied in the direction of undeformed chip thickness can result in the undeformed chip thickness becoming zero as in FIG. 9 (mathematically the undeformed chip thickness becomes zero or negative), thus forming a discrete chip 16 and also creating an intermittent gap between the tool 22 and the workpiece 26. In both cases, the cutting tool 22 is intermittently disengaged from the workpiece for a duration of time that is related directly to the machining and modulation conditions.

Since the modulation-assisted machining method is sufficiently general to be applied to a variety of machining processes (e.g. drilling, turning, boring, trepanning), it is beneficial to describe both methods for controlling modulation-assisted machining devices and various control algorithms for implementation in industrial applications.

C. Overview of the Components of the System

The present invention comprises a method for controlling a machining operation wherein a machine tool system 28 performs a machining operation on a workpiece 26. To practice the method, certain machine components should be provided that are best shown in FIG. 10. A tool holder 34 is provided for holding a tool 22, a workpiece holder 38 is provided for holding the workpiece 26, and a linear slide 32 is provided for linearly moving a linearly moving part. The linearly moving part can be either or both of the tool 22 and workpiece 26. A rotator 42 is provided for rotating a rotating part. The rotating part can be either or both of the tool 22 and workpiece 26. A modulator 30 is provided for modulating the movement of a modulated part. The modulated part can be either one of both of the tool 22 and workpiece 26. A digital controller 46 is provided for controlling the machining of the workpiece 26 by the tool 22. The digital controller 46 can include a series of indicator lights 48, a home 49, stop 52 and start 56 buttons, and directional selectors 58. An emergency stop 60 can also be provided. The digital controller 46 is preferably in hard wired communication with the other components (e.g. modulator 30, linear slide 32, accelerometer 64, displacement measurer 68, temperature measurer 72, etc.) shown in the drawings and described herein.

As described below, appropriate machining parameters are selected for enabling the tool 22 to perform a desired machining operation on the workpiece 26. The step of selecting appropriate machining parameters includes several steps. One step is selecting an appropriate feed rate for the linear slide 32 to move the linear moving part. An appropriate rotational speed is selected for the rotator 42 to rotate the rotating part.

Also, an appropriate modulation amplitude is selected for the modulator 30 to employ to move the modulated part an appropriate distance in a cycle. An appropriate modulation frequency is selected for the modulator 30 to employ to move the modulated part an appropriate number of cycles in a given time interval. The set of appropriate machining parameters are incorporated into the digital controller 46.

The digital controller 46 is then used to control the operation of a linear slide 32, rotator 42 and modulator 30 to execute the machining of the workpiece 26 by the tool 22 in accordance with a selected appropriate set of parameters.

D. Control Systems for Modulation Assisted Machining Tools

In modulation-assisted machining, the motion of the cutting tool 22 or workpiece 26 is typically a sinusoidal motion of the form A sin($\omega$t), where A is one-half the peak-to-peak amplitude of the modulation and $\omega$ is the angular frequency ($\omega=2\pi$fm and fm is the frequency of the modulation motion). The modulation conditions are prescribed by numerical models which may be calibrated based on experimental testing of tool holder assemblies 34, 30 for modulation-assisted machining.

These tool holder assemblies 30, 34, as described in U.S. Pat. Nos. 7,587,965 and 7,628,099, can be employed to perform modulation-assisted machining under specified modulation conditions (e.g., frequency and amplitude). The appropriate modulation conditions for a specified set of machining parameters can be calculated by the application of various mathematical algorithms that model the modulation assisted machining process. These algorithms can be applied within either an open-loop or closed-loop control framework.

In an open-loop control system for modulation-assisted machining, no feedback signal is present to modify or optimize the modulation motion of the cutting tool 22 that is prescribed by the algorithm. In this case, the fundamental machining parameters are provided as inputs to a mathematical algorithm that adjusts the signal that controls the tool holder assembly linear actuator 32 for the physical capacity of the system. Thus, the optimal modulation conditions are determined without consideration of the actual motion that results at the machining interface.

This is to be contrasted with the closed-loop control system, wherein a feedback signal may be used to modify or optimize the modulation conditions or the machining parameters in order to achieve an effective modulation condition.

In the present invention of an open-loop control system for machining processes, the motion of the cutting tool may be changed by altering the signal which controls the linear actuator 32 in a tool holder assembly 30 or by altering the machining parameters (such as rotational frequency of the rotating part, feedrate, etc.). The signal controlling the linear actuator of the tool holder assembly for modulation 30 may be a current, voltage or other signal, depending on the type of linear actuator implemented in the modulation tool holder assembly 30. In closed-loop control systems, a feedback signal is generated by a secondary measurement system installed in the system. The feedback signal modifies the input signal to the modulation tool holder assembly 30 or modifies the machining parameters such as feedrate or rotational speed to ensure that the tool holder achieves a prescribed condition of modulation.

In U.S. Pat. No. 7,587,965, a mathematical model for modulation-assisted machining was described that is based on a sinusoidal modulation of the machining feedrate or the cutting velocity. The process is dependent on primary machining parameters, including a (feedrate), fw (workpiece rotational frequency), n (the number of cutting edges), and the modulation parameters, A (½ peak-to-peak amplitude of modulation) and fm (modulation frequency). The proper selection of these modulation parameters is required for both the open-loop and closed-loop control systems described herein. A mathematical algorithm can be used determine these parameters.

E. Open-Loop Control Systems

Figure 2:
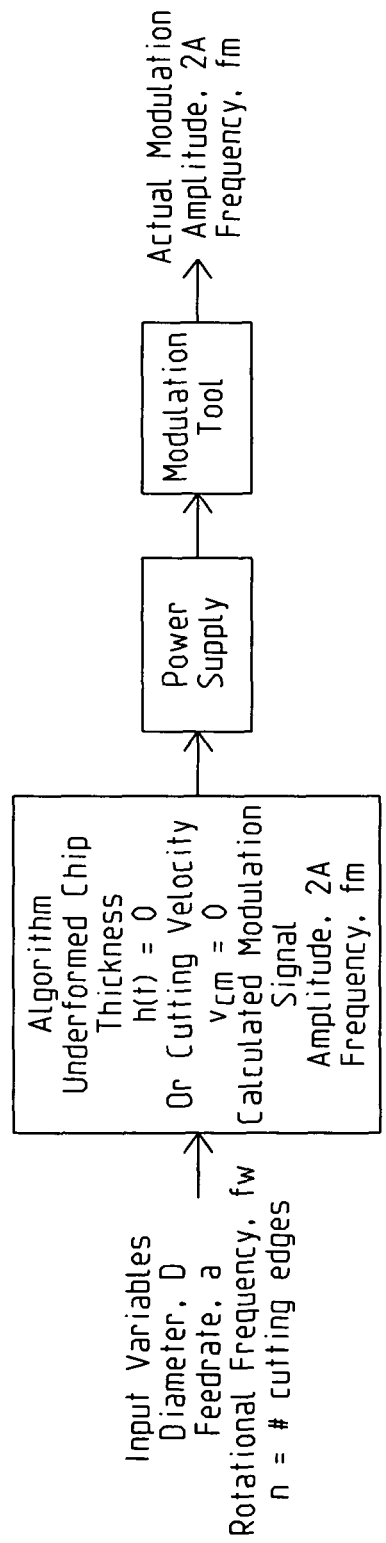
FIG. 2 is a schematic flow chart representation for an open-loop control of the modulation-assisted machining process.

In open-loop control systems, the modulation conditions are prescribed directly by a mathematical algorithm that determines the appropriate modulation parameters needed to enable effective modulation for a given set of machining parameters. Alternatively, a mathematical algorithm may be used to determine the appropriate machining parameters for a given set of modulation conditions. FIG. 2 shows a schematic of an open-loop control system for modulation tool holder assemblies.

In one embodiment of the invention, the tool holder assembly uses a piezo electric actuator to enable the modulation motion for drilling processes. The modulation is implemented in the feed direction of drilling to achieve periodic separation between the cutting tool (drill) and the workpiece, thus forming discrete chips of material. Effective modulation is described in this case to be that the undeformed chip thickness reaches zero or negative (i.e. $h(t) \leq 0$) during a modulation cycle, causing intermittent separation between the tool and the workpiece.

A mathematical algorithm is used to determine the appropriate modulation conditions, for a particular given specific set of machining parameters (e.g, feedrate, rotational frequency of the workpiece, number of cutting edges, and diameter). The amplitude of sinusoidal modulation must be marginally greater than the feed rate of the drilling process (2A>a) to account for system structural compliance in the tool holder assembly or some other combined elements of the machining system. The effects of system compliance can be accommodated by a direct increase in modulation amplitude to meet the requirement of 2A>a. In addition to system compliance, the operating characteristics of the linear actuator subject to specific loading conditions (e.g., normal force, torque) must be used to calibrate the relationships between the signal that controls the linear actuator in the tool holder assembly for modulation (e.g., voltage or current amplitude and frequency) and the actual modulation motion of the tool holder.

This calibration is shown conceptually in FIG. 3A and FIG. 3B. Based on the extant machining conditions, the relationships in FIGS. 3A and 3B are used to select appropriate modulation conditions to achieve effective modulation. The principles governing the exact selection of modulation conditions are presented in the teachings that follow.

F. Closed-Loop Control Systems

Various methods for monitoring the modulation conditions can be implemented in closed-loop control systems. In the closed-loop feedback control system, one or more feedback variables are used to achieve an effective modulation condition. While several elements of the open-loop control system may also be incorporated in the closed-loop system design (e.g., calibration of the actuator performance under specific loading conditions), the closed-loop system is more complex as a measurement system is used to dynamically monitor the process conditions and subsequently create signals to modify the original input signal. FIG. 4 shows the block flow chart diagram for an exemplary closed-loop control systems for modulation-assisted machining.

In the particular embodiment of the invention shown in FIG. 4, a feedback control loop monitors the output condition and modifies the signal conditions (e.g., voltage or current amplitude and frequency) that operate the linear actuator of the modulation tool holder assembly 30. Alternatively, the closed-loop feedback could be used to modify the machining conditions (e.g. feedrate, rotational frequency or cutting velocity, number of cutting edges, diameter) in order to achieve the prescribed modulation conditions.

Feedback control systems can be based on any number of measurement systems that monitor the contact conditions between the cutting tool and the workpiece. Measurement systems and data acquisition methods for closed-loop control may require signal processing or conversion of analog or digital data signals in order to be used effectively in the feedback loop. FIGS. 5 and 10 show a schematic example of a force dynamometer measurement system embedded between the tool holder 34 and ball-spline shaft 37 and an accelerometer measurement system 64 mounted to the tool holder 34. This provides a direct method for measuring the machining forces.

Changes in the machining force can be used to confirm the presence of effective modulation. For example, when modulation is applied for the purpose of producing chips of controlled size or shape, the change in machining force can indicate $h(t) \leq 0$ or $v_{cm} \leq 0$. The feedback signal from these measurement systems can also measure the modulation frequency by processing force response in the time domain using Fast Fourier Transforms.

In the preferred embodiment of the invention represented in the block diagram schematic in FIG. 6, the modulation tool holder motion is measured by an accelerometer 64. The signals from the accelerometer 64 provide the closed-loop feedback to modify the signal controlling the tool holder assembly actuator 30. The following additional measurement systems for feedback control signals are described for reference.

G. Displacement Measurement

The measurement of relative displacement between the cutting tool and the workpiece can be performed by using a displacement measure 68 (FIG. 10) such as inductive or capacitive transducers or linear variable transducers to measure the relative distance between the cutting tool edge and the workpiece.

H. Force Measurement

The presence of the small gap causes the instantaneous cutting force to become zero. Force dynamometers 60 can be used to monitor this condition and provide direct feedback control.

I. Acceleration Measurement

Industrial accelerometers 64 can be used to measure the motion of the cutting tool 22 during machining with modulation. Importantly, acceleration can be numerically integrated to resolve velocity and displacement of the modulation motion. Changes in the acceleration due to the intermittent contact conditions can be used as direct feedback control.

J. Temperature Measurement

A temperature measurer 72 that, for example employs infra-red (IR) thermography techniques or temperature thermocouples can be used to confirm an instantaneous reduction in machining temperature that occurs when cutting tool 22 disengages from the workpiece 26.

K. Current or Power Measurement

A current and/or power measurer 76 can be used to measure current or monitor power consumption during the modulation-assisted machining process can be used to directly control the process. These could include monitoring of the voltage, current or other electrical state of the linear actuator 32 that is used in a particular modulation device.

L. Image Analysis

An image analyzer 80 capable of performing a high-speed optical image analysis can be used to visually confirm the presence of the appropriate modulation conditions. The image analysis could be used to monitor the tool 22 cutting edge directly, or, alternatively, as a method to confirm the relative size or shape of the machining chip 16. Digital processing of the images can be used as a direct feedback control.

M. Digital Optical Encoder

A digital optical encoder 84 is a device that translates position or motion into a sequence of digital electrical pulses. The pulses can be counted and correlated to position or magnitude of displacement.

N. Closed-Loop Control System

FIG. 6 shows the general form of the closed-loop control system wherein the amplitude of modulation motion is controlled. In this embodiment, the amplitude of the sinusoidal waveform from the power amplifier is proportional to the difference between a target modulation amplitude and the actual modulation amplitude. The preferred measurement system is an industrial accelerometer 64. However, as mentioned previously the measurement system could be one chosen from a group of measurement systems listed above.

A mathematical algorithm operates on the difference between the reference amplitude (A_ref) and the actual modulation amplitude (A) obtained from an accelerometer directly attached to the moving portion of the tool holder assembly. The accelerometer directly measures the modulation tool assembly acceleration (mathematically, this is the second derivative of tool displacement with respect to time). Numerical integration of the acceleration with respect to time results in the actual modulation actuator displacement. This measurement of displacement is de-modulated to resolve the actual modulation amplitude A. The actual modulation amplitude is compared to the reference amplitude and the input signal to the power amplifier is modified accordingly to achieve the prescribed modulation conditions.

The flow diagram shown in FIG. 7 is an example of a closed-loop control system for modulation-assisted machining where the position of the modulation tool holder is measured as a function of time and compared to a reference signal that controls the linear actuator of a modulation tool holder assembly. In this method, the time-based measurement of tool position is compared to a reference signal which may be a waveform function (e.g. sinusoidal, triangular, square wave), or a prescribed empirical function. The direct measurement of the instantaneous tool holder position (e.g., using an accelerometer, displacement probes, or digital encoder) can be used as direct feedback of the modulation amplitude and also as a feedback control to verify that the time-based motion of the modulation tool holder agrees with a specific reference condition, x_ref(t).

O. Control System Algorithms for Modulation Assisted Machining Tool Assemblies Both the open-loop and closed-loop control systems for modulation-assisted machining require mathematical algorithms for implementation. In one embodiment of the invention, an open-loop control algorithm designed for drilling processes prescribes a sinusoidal waveform signal to a power amplifier that controls the motion of a piezoelectric actuated tool. The algorithm is driven by the fundamental equation for modulation frequency in Equation (1)

$$fm = n/2 * fw * (2*N+1) \qquad (1)$$

Where n is the number of cutting edges, fw is workpiece or tool rotational frequency and N is 0 or an integer.

In the present embodiment for drilling applications, the machining process parameters, including the feedrate a (mm/rev), workpiece or tool rotational speed fw (RPM), number of cutting edges n, and the diameter of the drill or workpiece D (mm) are used as inputs in the algorithm to calculate a target modulation amplitude A and modulation frequency fm. The algorithm determines if these conditions satisfy a series of constraints and then calculates the necessary voltage signal and frequency to operate a power amplifier for the piezo-based linear actuator in the tool holder assembly. If the system constraints are not satisfied, then the target modulation amplitude and frequency are then adjusted to ensure effective modulation. How and when this adjustment is made is dependent on the particular control system type (open or closed-loop) that implements this algorithm.

In the present embodiment a mathematical algorithm is constructed for an open-loop control system to achieve periodic separation of the tool and workpiece during drilling (i.e., $h(t) \leq 0$). Other embodiments that make use of closed-loop control and/or are intended for another purpose such as control of the local cutting velocity ($v_{cm}$) or control of chip size or shape (e.g. obtaining some target size of machining chip) follow from a similar development but use different logic or mathematical models.

In the present preferred embodiment, an effective modulation condition is defined such that the undeformed chip thickness is negative (i.e. $h(t) \leq 0$) during the modulation cycle, causing an intermittent separation between the tool and the workpiece. FIG. 8 shows a graphical representation of numerical solutions for the modulation amplitude required to achieve $h(t) \leq 0$ using a single flute drilling tool (n=1, fw=70 Hz, 2A≈0.020 mm) at a given fw. From the figure, the set of available modulation frequencies is unbounded and an infinite number of combinations of modulation frequency and amplitude (those that lie above the curves in the plot) can cause $h(t) \leq 0$. Similar curves can be constructed for modulation to achieve $v_{cm} \leq 0$. The spatial and temporal response of the physical modulation system limits the modulation frequency/amplitude combinations that can be achieved in practice. Although the set of mathematical solutions to $h(t) \leq 0$ is infinite in extent, the physical capacities and performance of a particular machining process and modulation tool holder assembly constrain the set of applicable solutions.

The algorithm determines solutions for modulation conditions that require the minimum modulation amplitude necessary to achieve $h(t) \leq 0$ (the minima of the curves in FIG. 8). In these solutions, the modulation effectiveness is least sensitive to variability in the other system parameters (e.g., spindle speed, feed rate) as the slope of this curve approaches zero near these conditions. These conditions occur when the relationship between the modulation frequency and the workpiece or tool rotational frequency satisfies the mathematical model described in Equation (1).

The selection of a specific frequency fm from this unbounded set requires consideration of (1) a minimum fm to create specified number of separations (disruptions) of the machining contact and (2) a maximum fm based on systematic limitations of the machine tool or modulation tool holder assembly. Thus, for the instant invention the unbounded set of modulation conditions for $h(t) \leq 0$ is intentionally bounded by a series of constraints which will be described herein in detail.

P. Constraints of the Modulation Tool Holder Assembly

The design of tool holder assemblies for modulation may require calibration data to operate a particular control algorithm for modulation assisted machining. In the present embodiment, this calibration will be described in terms of a piezo-electric actuator system where a power amplifier is used to drive the piezo-electric motion of the modulation tool holder assembly. In addition to determining the relationship between the electrical signal from a power amplifier and the resultant modulation motion of the tool holder assembly, the calibration identifies the performance envelope of the linear actuator itself, as was described earlier.

In the present invention, these calibration relationships were established from data such as that depicted in FIG. 3. The data in these figures relates the response of the modulation tool holder assembly subjected to a range of static loads (e.g. thrust and torque) which occur during physical drilling processes. A series of constants as shown in the graphs in FIG. 3 (e.g., b_calibration, c_calibration, d_calibration, Abs_max_App_calibration, fm_max_calibration) can be defined by empirical testing of the modulation tool holder assembly under a range of operating conditions (thrust load and torque). Additionally, the constants define the practical limitations that exist on both frequency and amplitude for a particular modulation tool holder assembly.

In the present embodiment, these constants can be derived from linear regression of the temporal and spatial response of a tool holder assembly subjected to various force and torque conditions and tested over a range of modulation frequencies and amplitudes.

The conceptual data in FIGS. 3A and 3B show a linear regression of the experimental data from testing of a modulation tool holder assembly. The peak voltage (Vpp) required to achieve a specific peak amplitude (App) in the piezo-electric actuator tool holder assembly is mapped at individual points. A series of these curves for FIG. 3A are constructed over a range of modulation frequency. In turn, the maximum possible peak amplitude that can be achieved for each frequency is used to construct FIG. 3B. The linear regression of the data depicted in FIG. 3B conceptually demonstrates a system calibration for the modulation amplitude as a function of modulation frequency. One skilled in the art could appreciate that in other systems for modulation-assisted machining, these calibration curves may be non-linear or second order, requiring more comprehensive multiple regression models and modification of corresponding control algorithm.

The constraints developed by the physical testing of the modulation system are not mathematically-required constraints, but rather are constraints adopted from an empirically-elucidated understanding of the performance characteristics of a particular modulation tool holder assembly. These empirical constraints may change depending on the particular design of modulation tool holder assembly.

Q. Maximum Modulation Frequency Constraints

In practice, the rotational frequency of a workpiece (or cutting tool), fw, is limited by the physical capacity of a machine tool spindle or a rotating modulation tool holder assembly. Similarly, the maximum possible modulation frequency, fm, is limited by structural dynamics and/or specifications of the modulation tool holder assembly 30 (e.g., response under load). Thus, constraints can be imposed on both modulation frequency and amplitude in the practical application of tool holder assemblies 30 for modulation-assisted machining. These constraints are determined by the physical response of the tool holder assembly 30.

The calibration of the modulation system is characterized through empirical testing under a range of modulation amplitudes and frequencies using varying static load conditions (e.g., thrust force and torque), as depicted in FIG. 3. The resulting response curve identifies the maximum physical limit of modulation frequency, which is used here to place an upper bound on the range of modulation amplitude and frequency for the mathematical algorithm (Abs_max_App_calibration and fm_max_calibration, respectively).

The maximum modulation frequency can also be bounded by a maximum prescribed number of intermittent separations between the cutting tool 22 and workpiece 26 desired for a given process. For the present invention, this condition, referred to as cb_max, defines the number of separation events per revolution of the workpiece 26 (or cutting tool 22). From the critical modulation conditions it can be shown that a minimum constraint exists for cb_max where cb_max=fm_max_cbmax/fw=(n/2)*(2*N+1). Since N must be 0 or a positive integer, cb_max must be equal or greater than n/2.

The definition of cb_max can be based on some geometric or non-geometric condition. For example, cb_max may be related to some fraction, z, of the hole circumference cb_max=πD/z or some other geometric condition chosen by engineering analysis or experimental testing and analysis. Regardless of the basis for the definition of cb_max, the condition limits the maximum modulation frequency to fm_max_cbmax=fw*cb_max.

R. Minimum Modulation Frequency Constraints

In the present invention, a minimal number of discrete cutting events are desirable during each revolution of the tool or workpiece, to realize the benefits of modulation. A minimum number of these events then prescribes a minimum constraint for modulation frequency. This adjustable parameter is referred to as cb_min, the minimum number of modulation cycles per revolution. Thus, the previously unbounded set of solutions for the modulation parameters (specifically, fm) is now bounded on the minimum side by cb_min and on the maximum side by physical limitations established by the experimental calibration data, Abs_max_App_calibration and fm_max_calibration, as well as by cb_max.

S. Machining Process Parameter Constraints

The input variables of the mathematical algorithm are also bounded by a series of process constraints related to the machining process parameters. The first constraint requires the workpiece 26 (or tool 22) rotational frequency (input in rotations per minute) to be an integer multiple of 60. This effectively provides an integer value of rotational frequency and enhances the stability of the mathematical algorithm by preventing rotational frequencies that increase sensitivity to modulation frequency (i.e., the slope of the curves in FIG. 8 demonstrate the sensitivity).

From the mathematical relationship for undeformed chip thickness, h(t), it is also apparent that the selection feed rate a and spindle speed, fw parameters are also constrained as they are used to determine an appropriate modulation frequency fm. Depending on the capacity of the particular modulation tool holder assembly, it is possible to select machining parameters of a and fw that may result in an fm that exceeds the limits established by experimental calibration curves in FIG. 3 or require an amplitude, A, that lies outside the operating ranges defined by the calibration curves of FIG. 3. In these cases, the values of feedrate (a) and/or rotational frequency (fm) must be reduced in order to operate within the performance envelop of the particular modulation tool holder assembly.

T. Geometric Constraints for Modulation Assisted Machining

Additional geometric constraints occur with the application of modulation assisted machining. FIG. 9 shows a two-dimensional schematic representation for the tool geometry relative to a sinusoidal profile in modulation-assisted machining. Since the machining process occurs with a tool of finite geometry, the cutting edge must traverse a prescribed sinusoidal profile, defined by amplitude and frequency, without causing physical interference at the interface. The relative clearance angle of the cutting tool (e.g., relief angle β) limits the process, as the cutting edge of the tool must traverse the sinusoidal profile without the back side of the tool interfering with the surface. Mathematically, this is defined by a critical relief angle, β, where the minimum relief angle of the tool must satisfy Equation (2).

$$\beta > \arctan[(a*fw+2\lambda*fm*A)/v_{cm}] \quad (2)$$

Where $v_{cm}$ is the cutting velocity.

In many machining processes (exceptions being straight cylindrical or surface grinding or shaping operations) $v_{cm}$ varies along the edge of the cutting tool due to either changes in the tool geometry or the relative surface speed of the workpiece. For example, in the case of drilling processes or turning processes on rotating bodies, the tangential velocity (cutting velocity) becomes zero at the tool or workpiece centerline. The same is true for the center of rotating cutting tools. This implies that an infinite relief angle, β, would be required for effective modulation. However, in practical drilling processes the chisel edge of the drill effectively extrudes material and the cutting portion of the process occurs at the drill lips.

Since industrial tools are manufactured with a variety of relief angles depending on the drill type and drill manufacturer, a general constraint for relief angle is not possible. In lieu of a general constraint on relief angle, a more practical constraint could be defined for any given drill geometry.

U. Working Examples

The following examples in Table 1 are provided to demonstrate the use of open loop-control systems for modulation assisted machining. In the examples, A-C, the feedrate a (mm/rev), workpiece or tool rotational speed fw (RPM), number of cutting edges n, and the diameter of the drill or workpiece D (mm) are used as inputs in the algorithm to calculate a target modulation amplitude, A and modulation frequency, fm. The open-loop control algorithm determines if these conditions satisfy a series of constraints and then calculates the necessary voltage signal and frequency to operate a piezo-based linear actuator in the tool holder assembly. For a closed-loop control system the Modulation Assisted Machining conditions would be modified continuously to ensure the control condition. In the examples shown the control condition was to achieve undeformed chip thickness, h(t)≤0.

| Example | Machining process description | Purpose of Modulation Assisted Machining | Baseline Machining Conditions | Open-loop control: Modulation Assisted Machining conditions |
|---|---|---|---|---|
| A | Single Flute Drilling | control chip formation and allow increased drilling | n = 1 cutting edge. diameter D = 3.3 mm. | fw = 4800 RPM, a = 0.030 mm/rev. |

| Example | Machining process description | Purpose of Modulation Assisted Machining | Baseline Machining Conditions | Open-loop control: Modulation Assisted Machining conditions |
|---------|-------------------------------|------------------------------------------|-------------------------------|-------------------------------------------------------------|
|   | Steel Alloy | feedrate. h(t) < 0 | fw = 4800 RPM. a = 0.020 mm/rev | fm = 200 Hz. A = 0.020 mm |
| B | Cylindrical Turning Titanium Alloy | create intermittent separation and enhance lubrication, h(t) < 0 | n = 1 cutting edge. diameter D = 152 mm fw = 114 RPM. a = 0.050 mm/rev | fw = 114 RPM. a = 0.050 mm/rev. fm = 99.75 Hz. A = 0.030 mm |
| C | Plunge Turning Aluminum Alloy | produce particle fiber chips of controlled size and shape. h(t) < 0 | n = 1 cutting edge. starting diameter D = 12.75 mm. fw = 9000 RPM. a = 0.007 mm/rev | fw = 900 RPM a = 0.007 mm/rev fm = 825Hz A = 0.005 mm |

While the invention has been described in terms of particular embodiments, it is apparent that other forms, variation and modifications could be adopted by one skilled in the art. Accordingly, the scope of the invention is limited only by the following claims.

What is claimed:

1. A method for controlling a machining operation wherein a tool performs a machining operation on a work piece, comprising
   (a) providing a tool holder for holding the tool, a work piece holder for holding the work piece, a linear slide for linearly moving a linearly moving part comprising at least one of the tool and work piece, a rotator for rotating a rotating part comprising at least one of the tool and work piece, a modulator for modulating the movement of a modulated part comprising at least one of the tool and work piece, and a digital controller for controlling the machining of the work piece by the tool, wherein the digital controller is capable of sending a control signal for controlling the operation of at least one of the linear slide, rotator and modulator,
   (b) selecting a set of appropriate machining parameters to employ for enabling the tool to perform a desired machining operation on the work piece, the step of selecting a set of appropriate machining parameters including the steps of:
      (1) selecting an appropriate feed rate for the linear slide to move the linear moving part;
      (2) selecting an appropriate rotational speed for the rotation to rotate the rotating part;
      (3) selecting an appropriate modulation amplitude for the modulator to employ to move the modulated part an appropriate distance in a cycle;
      (4) selecting an appropriate modulation frequency for the modulator to employ to move the modulated part an appropriate number of cycles in a given time interval;
   (c) incorporating the set of appropriate machining parameters into the digital controller;
   (d) inputting machining parameters into an algorithm for adjusting the control signal sent by the digital controller to at least one of the linear slide, rotator and modulator for controlling the operation of at least one of the linear slide, rotator and modulator, and
   (e) using the digital controller to control the operation of the linear slide, rotator and modulator to execute the machining of the workpiece by the tool in accordance with the appropriate set of parameters,
   wherein the machining parameters are selected from the group consisting of the feedrate a (mm/rev), workpiece or tool rotational speed fw (RPM), of cutting edges n, and the diameter of the drill or workpiece D (mm).

2. The method of controlling a machining operation of claim 1 wherein the mathematical algorithm is such that the undeformed chip thickness reaches zero during each cycle of modulation $h(t) \leq 0$ where the modulation frequency is related to the to the tool or workpiece rotational frequency by the fundamental equation $fm = n/2 * fw * (2*N+1)$ where N is 0 or an integer and the modulation amplitude A satisfies $2A > a$ where a is the feedrate of the machining process.

3. The method of controlling a machining operation of claim 1 further comprising the step of providing a sensor for determining an output parameter of at least one of the tool, workpiece and chips during the machining operation and using, the determined output parameter to adjust the operation of at least one of the linear slide, rotator and modulator to improve the output of the machining operation.

4. The method of controlling a machining operation of claim 3 wherein the output parameter measured comprises at least one of chip size, chip quantity, chip shape, rotator speed, linear slide velocity, feed rate, tool speed, modulator frequency, modulator amplitude, modulator acceleration, machining temperature, or machining forces.

5. The method of controlling a machining operation of claim 3 wherein the step of adjusting the operation of at least one of the linear actuator, rotator and modulator includes at least one of the steps of:
   (1) adjusting the operation of at least one of the linear slide, rotator and modulator to change the cutting force between the tool and the workpiece,
   (2) adjusting the linear displacement of the linear slide moving part,
   (3) changing the feed rate at which the linear slide moves at least one of the tool and workpiece into engagement with the other of the tool and the workpiece,
   (6) changing at least one of the voltage or current to the linear slide part
   (5) changing the rotational speed at which the rotator rotates the rotated part
   (6) changing oscillation amplitude of the modulator part,
   (7) changing the oscillation frequency of the modulated part,
   (8) changing the velocity of the cutting tool,
   (9) changing the number of cutting edges of the cutting tool;
   (10) changing the diameter of the cutting tool; and
   (11) monitoring at least one of the voltage, current and electrical state of the linear actuator of the modulator part.

6. The method of controlling a machining operation of claim 3 wherein the step of providing a sensor comprises the step of providing at least one of a force dynamometer measuring system and an accelerometer.

7. The method of controlling a machining operation of claim 6 wherein the step of providing a tool holder includes the step of providing a ball spline shaft coupled to the tool holder, wherein the step of providing at least one of a force dynamometer measuring system and accelerometer comprise the step of providing a force dynamometer embedded between the tool holder and ball spline shaft, and providing an accelerometer mounted to the tool holder, and wherein the step of providing a modulator includes the step of providing a modulator having a linear actuator.

8. The method of controlling a machining operation of claim 3 wherein the step of providing a sensor comprises the step of providing a transducer for measuring relative distance between the tool and the workpiece.

9. The method of controlling a machining operations of claim 8 wherein the transducer comprises at least one of an inductive transducer, capacitor transducer and a linear variable transducer.

10. The method of controlling a machining operation of claim 3 wherein the step of providing a sensor comprises the step of providing a temperature measuring sensor for sensing temperature changes that occur because of at least one of engagement and disengagement of the tool and the workpiece.

11. The method of controlling a machining operation of claim 3 wherein the step of providing a sensor comprises the step of providing a sensor capable of monitoring at least one of the voltage, current or electrical state of the linear actuator.

12. The method of controlling a machining operation of claim 3 wherein the step of providing a sensor comprises the step of providing a digital image device for providing visual image feedback to a user.

13. The method of controlling a machining operation of claim 3 wherein the step of providing a sensor comprises the step of providing a digital optical encoder for translating at least one of position or motion of at least one of the rotator, linear actuator, modulator, tool, tool holder and workpiece into a pulse capable of yielding information relating to at least one of position and magnitude of displacement.

14. The method of controlling a machining operation of claim 1 wherein the step of selecting a set of appropriate machining parameters include selecting an appropriate relative feed rate and rotational speed to achieve maximum production rate and desired chip size and thickness, by factoring into the selection process desired chip size, and material type.

15. The method of controlling a machining operation of claim 1 wherein the step of selecting the appropriate feed rate, selecting the appropriate modulation application and selecting the appropriate modulation frequency include the step of selecting an appropriate feed rate, modulation frequency and modulation amplitude to control intermittent separation between the tool and the workpiece for achieving desired characteristics of the chip.

16. The method of controlling a machining operation of claim 15 wherein the desired chip characteristics include at least one of chip size, chip thickness and chip shape and chip discreetness.

17. The method of controlling a machining operation of claim 1 wherein the step of selecting a set of appropriate machining parameters includes the step of employing at least one algorithm to determine at least one parameter of the set of machining parameters, wherein the algorithm requires input of at least one calibration constraints.

18. The method of controlling a machining operation of claim 1 wherein the algorithm includes variables to account for at least one workpiece factor selected from the group consisting of material type, material harness, temperatures, chip sizes, tool flute size, cutting, angle and cutting surfaces configuration, and cooling material.

19. The method of controlling a machining operation of claim 1 wherein the step of inputting machine parameters into an algorithm for controlling the operation of the modulator includes the step of selecting an appropriate modulation frequency and a modulation amplitude comprising the step of selecting an input wave form having the desired modulation amplitude and modulation frequency characteristics.

20. The method of controlling a machining operation of claim 19, wherein the step of selecting an input wave form comprises the step of selecting a wave input form from the group consisting of generally sinusoidal wave forms, generally triangular wave forms, and generally square wave forms.

21. The method of controlling a machining operation of claim 19 wherein the step of selecting an input wave form comprises the step of selecting a wave input form having a form of $A \sin(\omega t)$ wherein A equals one half the peak to peak amplitude of the modulation,
$\omega$ equals the angular frequency, and
t is time.

* * * * *